(12) United States Patent
Oura

(10) Patent No.: US 6,172,868 B1
(45) Date of Patent: Jan. 9, 2001

(54) KEYBOARD DEVICE AND PERSONAL COMPUTER USING THE SAME

(75) Inventor: Nobuhiro Oura, Fukushima-ken (JP)

(73) Assignee: Alps Electric Co., Ltd. (JP)

( * ) Notice: Under 35 U.S.C. 154(b), the term of this patent shall be extended for 0 days.

(21) Appl. No.: 09/124,954

(22) Filed: Jul. 29, 1998

(30) Foreign Application Priority Data

Jul. 30, 1997 (JP) .................................... 9-173639

(51) Int. Cl.[7] .................................................. H05K 7/04
(52) U.S. Cl. .......................... 361/680; 361/681; 361/682; 200/344; 200/345
(58) Field of Search ............................ 316/680; 200/344, 200/345; 361/681, 682

(56) References Cited

U.S. PATENT DOCUMENTS

| | | | |
|---|---|---|---|
| 5,399,822 | * | 3/1995 | Sato et al. ............................. 200/344 |
| 5,519,569 | * | 5/1996 | Sellers ................................... 361/680 |
| 5,532,904 | * | 7/1996 | Sellers ................................... 361/689 |
| 5,602,715 | * | 2/1997 | Lempicki et al. .................... 361/680 |
| 5,994,655 | * | 11/1999 | Tsai ....................................... 200/344 |

FOREIGN PATENT DOCUMENTS 8-54964   6/1995   (JP) .

\* cited by examiner

Primary Examiner—Leo P. Picard
Assistant Examiner—Hung Van Duong
(74) Attorney, Agent, or Firm—Brinks Hofer Gilson & Lione

(57) ABSTRACT

A keyboard device and a personal computer including a housing member made slidable, so that a membrane switch is not slid. Such a structure, designed to make the keyboard device and the personal computer thinner, makes it possible to provide very reliable, cheap, thin keyboard devices and personal computers which allow an electrical circuit in the personal computer and the membrane switch to be easily connected. Accordingly, the keyboard device and the personal computer having the above-described structure overcome the problems produced in conventional keyboard devices and personal computers using conventional keyboard devices. These were made thinner by making the membrane switch slide, which has resulted in a complicated electrical connection between an electrical circuit in the personal computer and the membrane switch, increased costs, and lack of electrical reliability.

11 Claims, 7 Drawing Sheets

KEYBOARD DEVICE AND PERSONAL COMPUTER USING THE SAME

BACKGROUND OF THE INVENTION

1. Field of the Invention

The present invention relates to a keyboard device suitable for use in, for example, a notebook personal computer which needs to be thin. In addition, the present invention relates to a personal computer employing the aforementioned keyboard device.

2. Description of the Related Art

One type of personal computer includes a rotatable cover above the computer body. A keyboard device is incorporated in the computer body, and a display device is incorporated in the rotatable cover. When the personal computer is in use, the cover with a display device incorporated therein is opened, whereas when the personal computer is not in use, the cover is closed so that the keyboard device is covered from above it. In the personal computer of the type described above, in order to make the keyboard device thinner, the key switches of the keyboard device are formed, as shown in FIGS. 10 and 11.

Each key switch has a boat-shaped key top 58, two retainer portions 58 disposed at the back side of each key top 58, two retainer portions 58c each with a slide groove 58b, and a key top supporting structure L disposed below each key top 58. Each key top supporting structure L comprises a first lever portion 56 and a second lever portion 57, with the first lever portion and the second lever portion being combined so as to form a cross. One end of each first lever portion 56 is rotatably retained by the retainer portions 58a of the key top 58 associated thereto. One end of each second lever portion 57 is slidably inserted into the slide grooves 58b in the retainer portions 58c of the key top 58 associated thereto.

Below the key top supporting structures L is disposed a key top supporting member 55 with a slide groove 55b for slidably retaining the other end of the first lever portions 56, and a retainer portion 55a for rotatably retaining the other end of the second lever portions.

A membrane switch 54 is disposed below the key top supporting member 55 so as to be slidable on a flat supporting substrate 60 and between the key top supporting member 55 and the supporting substrate 60. The membrane switch 54 is a laminated structure including, from bottom to top, a protective sheet 54a, a stationary contact sheet 54b, a spacer sheet 54c, a movable contact sheet 54d, and a protective sheet 54e. These sheets are integrally bonded together. At a hole 54f in the spacer sheet 54c, a contact 54g on the sheet 54d and a contact 54h on the sheet 54d oppose each other.

A dome-shaped resilient member 59 with a protrusion 59a used for operating a switch is provided below each key top supporting structure L, such that the top portion thereof opposes its associated key top supporting structure L and the bottom portion is mounted to the membrane sheet 54.

Accordingly, the keyboard device is constructed as described above.

As shown in FIGS. 12 and 13, the personal computer includes a cam projection 515a and a spring member 517. The cam projection 515a is provided at the front side of the cover 515 with a display device (not shown). The spring member 517 is disposed between the membrane switch 54 of the keyboard device mounted within a body 513 and a side wall 516 of the body 513.

In addition, when the personal computer having the above-described structure is ordinarily used by opening the cover 515 and operating the keyboard device 512, the key top supporting structures L are raised and supported by their corresponding resilient members 59 at their highest positions, as shown in FIG. 10. When an operator pushes a dome-shaped key top 58 downward against the resilient force of the resilient member 59 associated thereto, the inwardly projecting portion 59a of the associated resilient member 59 pushes the protective sheet 54e and the sheet 54d of the membrane switch 54, causing the contact 54h to come into contact with the contact 54g, whereby the switch is set in an on state.

Thereafter, releasing the key top 58 causes the resilient member 59 to return back to its original state due to its resiliency, and the associated supporting structure L and key top 58 to be restored back to its original state, causing the contact 54h to separate from the contact 54g, whereby the switch is set in an off state.

Accordingly, contact switching is performed.

As shown in FIGS. 11 and 13, lowering the cover 515 onto the keyboard device 512 causes the cam projection 515a to engage the left end of the membrane switch 54 of the keyboard device, causing the membrane switch 54 to move to the right against the spring force of the spring member 517. This causes the membrane switch 54 to slide in sliding contact between the supporting substrate 60 and the key top supporting member 55, and the resilient members 59 to move in the same direction and move out from below their corresponding key top supporting structures L. Disengagement of the resilient members 59 from below their corresponding key top supporting structure L causes the key top supporting structures L to be lowered due to its own weight, causing the key tops 58 to be lowered downward. This reduces the thickness of the entire keyboard device 512.

When the cover 515 is opened, the cam projection 515a disengages the membrane switch 54, whereby the spring member 517 causes the membrane switch 54 to slide in sliding contact between the supporting substrate 60 and the key top supporting member 55, and move back to its original position. Since, as a result of the sliding movement of the membrane switch 54, the resilient members 59 slide back to the bottom portion of their corresponding key top supporting structures L in sliding contact therewith, the key top supporting structures L are pushed back upward by their respective resilient members 59, which in turn causes the corresponding key tops 58 to rise upward and horizontally in order to be supported at their highest positions.

Thereafter, operations, such as those described above, are repeated to perform contact switching.

In such conventional keyboard devices and personal computers employing the aforementioned conventional keyboard devices, since the membrane switch 54 is slid, the electrical connecting structure between the electrical circuit in the personal computer and the sliding membrane switch 54 is complicated, which not only leads to high costs but also to lack of electrical reliability.

In addition, since the resilient member 59 is slid along its associated key top supporting structure L, the resilient member 59 has a shorter life. Moreover, since the resilient member cannot move smoothly, it cannot be operated with ease.

SUMMARY OF THE INVENTION

In order to overcome the above-described problems, according to a first aspect of the present invention, there is provided a keyboard device comprising: a key top; a first lever portion having one end slidably retained by a housing member and the other end rotatably retained at a back side of the key top; a second lever portion having one end rotatably retained by a supporting member disposed below the housing member and the other end slidably retained at the back side of the key top; and a membrane switch disposed between the housing member and the supporting member; wherein the first lever portion and the second lever portion are combined through a shaft member into the shape of a cross; wherein the supporting member and the membrane switch are affixed together; and wherein the housing member is slidably retained, with the sliding movement of the housing member causing the first lever portion and the second lever portion combined into the shape of a cross to be raised and lowered.

Although not exclusive, the keyboard device may further comprise a switch operating resilient member provided at a back surface of the key top.

Although not exclusive, the keyboard device may further comprise a spring member for pushing the one end of the first lever portion in an inward direction.

According to a second aspect of the present invention, there is provided a keyboard device comprising a key top; a first lever portion having one end slidably retained by a housing member and the other end rotatably retained at a back side of the key top; a second lever portion having one end rotatably retained by a supporting member disposed below the housing member and the other end slidably retained at the back side of the key top; and a membrane switch disposed between the housing member and the supporting member; wherein the first lever portion and the second lever portion are combined through a shaft member into the shape of a cross; wherein the housing member is affixed to the membrane switch; and wherein the supporting member is slidably retained, with the sliding movement of the supporting member causing the first lever portion and the second lever portion combined into the shape of a cross to be raised and lowered.

According to a third aspect of the present invention, there is provided a personal computer comprising any one of the aforementioned keyboard devices.

According to a fourth aspect of the present invention, there is provided a personal computer comprising a keyboard device including a plurality of arranged key switches, each key switch including a key top; a first lever portion having one end slidably retained by a housing member and the other end rotatably retained at a back side of the key top corresponding thereto; a second lever portion having one end rotatably retained by a supporting member disposed below the housing member and the other end slidably retained at the back side of the key top corresponding thereto; and a membrane switch disposed between the housing member and the supporting member; wherein the first lever portion and the second lever portion are combined through a shaft member into the shape of a cross; wherein the supporting member and the membrane switch are affixed together; and wherein the housing member is slidably retained, with the sliding movement of the housing member causing the first lever portion and the second lever portion combined into the shape of a cross to be raised and lowered; and wherein the personal computer further comprises a rotatable cover with a display device incorporated therein; wherein the housing member slides in response to an opening or a closing operation of the cover.

According to a fifth aspect of the present invention, there is provided a personal computer comprising a keyboard device including a plurality of arranged key switches, each key switch including a key top; a first lever portion having one end slidably retained by a housing member and the other end rotatably retained by a back side of the key top corresponding thereto; a second lever portion having one end rotatably retained by a supporting member disposed below the housing member and the other end slidably retained by the back side of the key top corresponding thereto; and a membrane switch disposed between the housing member and the supporting member; wherein the first lever portion and the second lever portion are combined through a shaft member into the shape of a cross; wherein the housing member and the membrane switch are affixed together; and wherein the supporting member is slidably retained, with the sliding movement of the supporting member causing the first lever portion and the lever portion combined into the shape of a cross to be raised and lowered; and wherein the personal computer further comprises a rotatable cover with a display device incorporated therein; wherein the supporting member slides in response to an opening or closing operation of the cover.

DESCRIPTION OF THE PREFERRED EMBODIMENT

Figure 1:
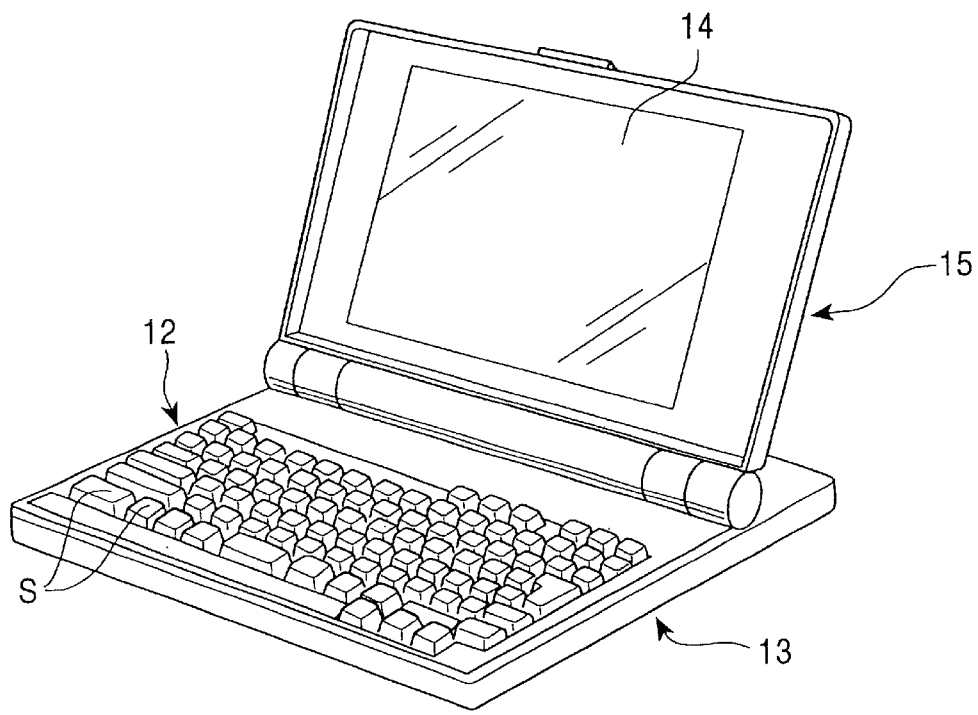
FIG. 1 is a perspective view of a personal computer with a keyboard device incorporated therein in accordance with the present invention.

A description will now be given of an embodiment of a personal computer with a keyboard device incorporated therein in accordance with the present invention, with reference to FIGS. 1 to 9. FIG. 1 is a view showing a personal computer with a keyboard device incorporated therein in accordance with the present invention. The personal computer comprises a computer body formed by incorporation of a keyboard device 12 with a plurality of key switches S disposed in each row, and a cover 15 with a display device 14 incorporated therein so as to be rotatable at the body 13. When in use, the cover 15 with the display device 14 is opened in order to allow operation of the keyboard device 12 for displaying information on the display of the display device 14. When not in use, the cover 15 is closed by rotating the cover 15 onto the keyboard device 12, whereby the keyboard device 12 is covered from above by the cover 15.

Figure 3:
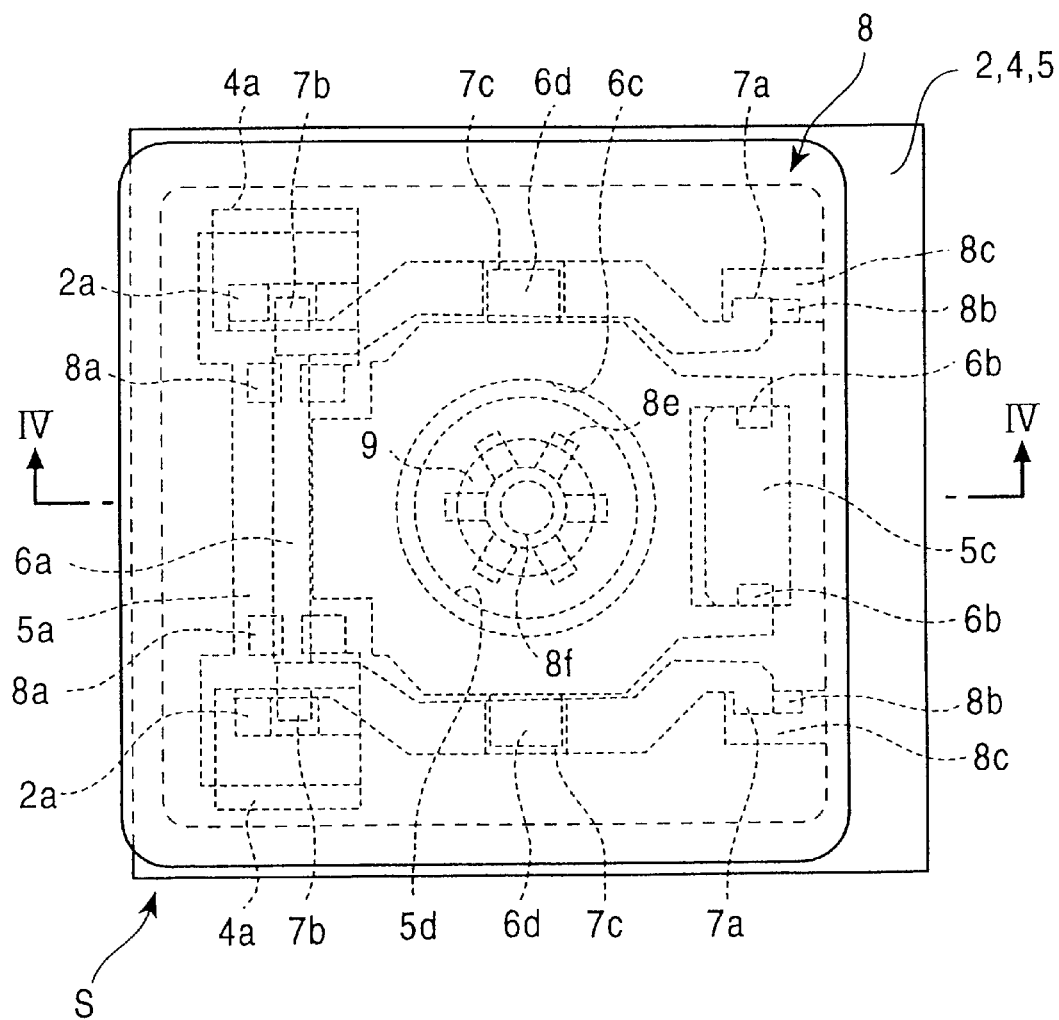
FIG. 3 is a plan view showing a portion of the keyboard device in accordance with the present invention.
Figure 4:
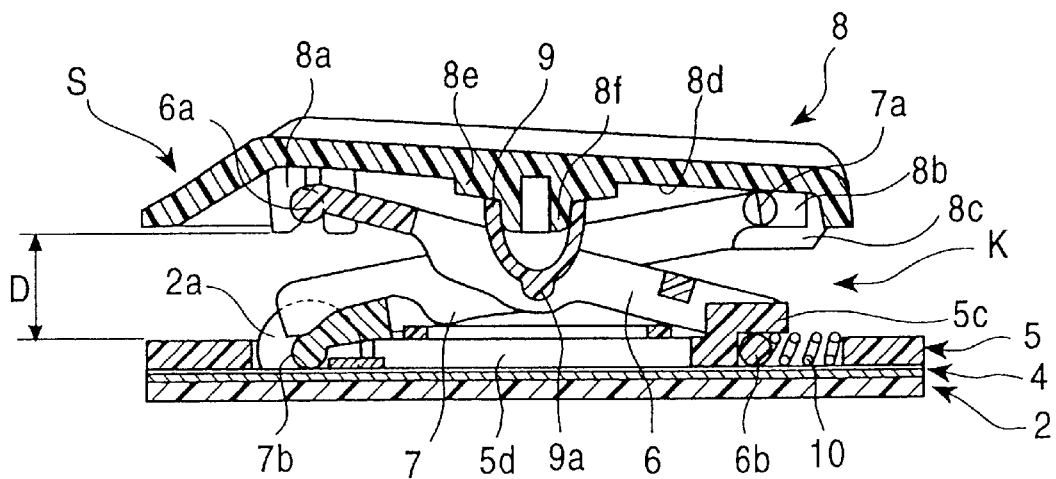
FIG. 4 is a sectional view taken along line 4—4 of FIG. 3.
Figure 5:
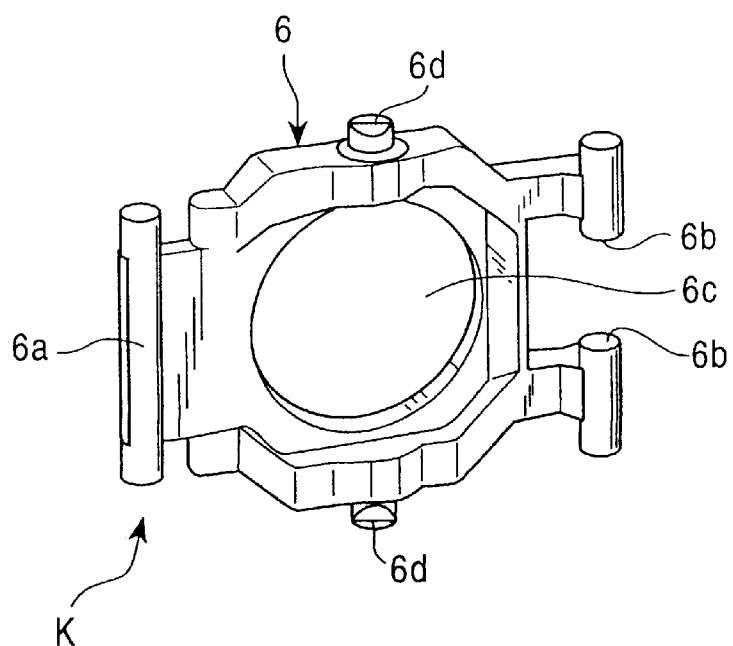
FIG. 5 is a perspective view of the first lever portion of the keyboard device in accordance with the present invention.
Figure 6:
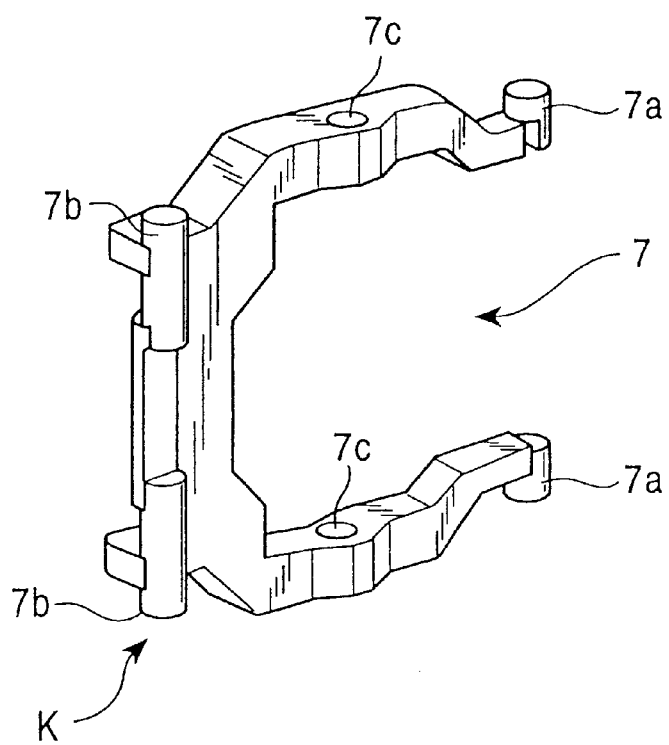
FIG. 6 is a perspective view of the second lever portion of the keyboard device in accordance with the present invention.

In FIGS. 3 and 4, each of the key switches S is made of synthetic resin, and has a boat-shaped key top 8. At the back side of each key top 8 are disposed in a row two retainer portions 8a and two L-shaped retainer portions 8c each with a slide groove 8b. At about the center of a back side 8d of each key top 8 is provided a relatively thin, radially-extending base portion 8e. A protrusion 8f is provided at the center of each base 8e. A resilient member 9 is affixed to each protrusion 8f, and pushes a membrane switch 4 by the lowering of the associated key top 8. Each resilient member 9, being a hanging bell shaped member, includes a protrusion 9a at the center thereof which deforms resiliently when it comes into contact with the membrane switch 4, and pushes the membrane switch 4 for operation. Since each resilient member 9 deforms resiliently, an overstroke pushing force can be exerted onto the membrane switch 4, when a contact moves beyond its on state position.

Each key switch S has a key top supporting structure K having a first lever portion 6 (shown in FIG. 5) made of synthetic resin, and a second lever 7 (shown in FIG. 6) also made of synthetic resin.

Each first lever portion 6 is substantially square-shaped, and has a rod-shaped retainer portion 6a at one end thereof which is rotatably retained by the retainer portions 8a of its associated key top 8, circular protrusions 6b at the other end thereof, an opening 6c at the center thereof for receiving the resilient member 9 associated thereto, and shaft members 6d between the two ends which protrude outward.

Each second lever portion 7 is substantially C-shaped, and has circular protrusions 7a at one end thereof which are slidably inserted into the slide grooves 8b of the retainer portions 8c of the associated key top 8, circular protrusions 7b at the other end thereof, and openings 7c between the associated circular protrusions 7a and 7b. The shaft members 6d of each of the first lever portions 6 are slidably inserted into their corresponding openings 7c, whereby each key top supporting structure K is formed as a result of combining the first lever portions 6 and the second lever portions 7 so that they form a cross shape.

Figure 7:
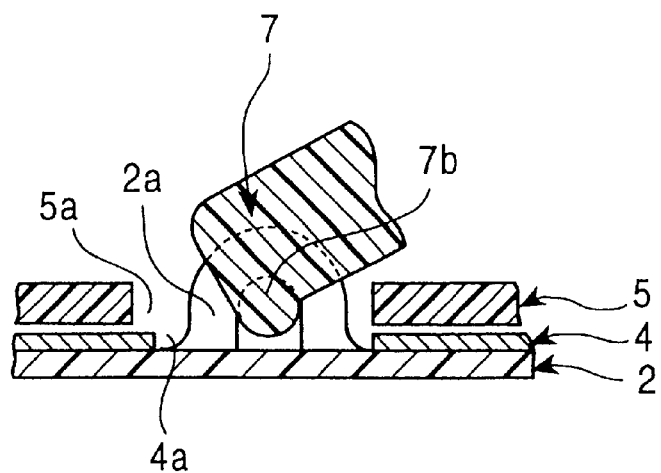
FIG. 7 is a sectional view showing the main portion of the keyboard device in accordance with the present invention.

As shown in FIGS. 3, 4, and 7, below each key top supporting structure K is disposed a housing member 5 made of synthetic resin. Each includes a slot 5a, a retainer portion 5c disposed away from its associated slot 5a and including one slide groove 5b, and a circular hole 5d formed between the retainer portion 5c and the slot 5a associated thereto and allowing the associated resilient member to move in and out of the circular hole 5d. Although the housing member 5 is described as being made of synthetic resin, when a metallic plate is used, the heat is dissipated more effectively from the central processing unit (CPU) in the personal computer. The protrusions 6b of each first lever portion 6 are supported by their corresponding retainer portions 5c so as to be slidable into the slide groove 5b corresponding thereto. A spring member 10 is provided in each slide groove 5b for pushing the protrusions 6b of any one of the first lever portions 6 in the direction of its associated hole 5d, that is towards the interior of its associated key top. The spring member 10 is preferably a coil spring or a leaf spring.

Below the housing members 5 is disposed a membrane switch composed of an upper flexible sheet (not shown) with stationary contacts and a lower flexible sheet (not shown) with movable contacts. At the hole 5d in each of the housing members 5, the stationary contacts (not shown) and their corresponding movable contacts (not shown) oppose each other. As shown in FIG. 7, the membrane switch 4 includes an opening 4a formed in correspondence with both edges of the slot 5a of its associated housing member 5. Below the membrane switch 4 is disposed a supporting plate 2 formed of, for example, a metallic plate, with a retainer 2a, extending through the associated opening 4a of the membrane switch 4 and inserted into the slot 5a of the associated housing member 5, being formed at the surface of the supporting plate 2. Each retainer portion 2a has a hole for rotatably retaining the protrusions 7b of its associated second lever portion 7. When the retainer portions 2a are formed by molding so as to protrude from the supporting plate 2, the retainer portions 2a can be produced with ease.

Figure 2:
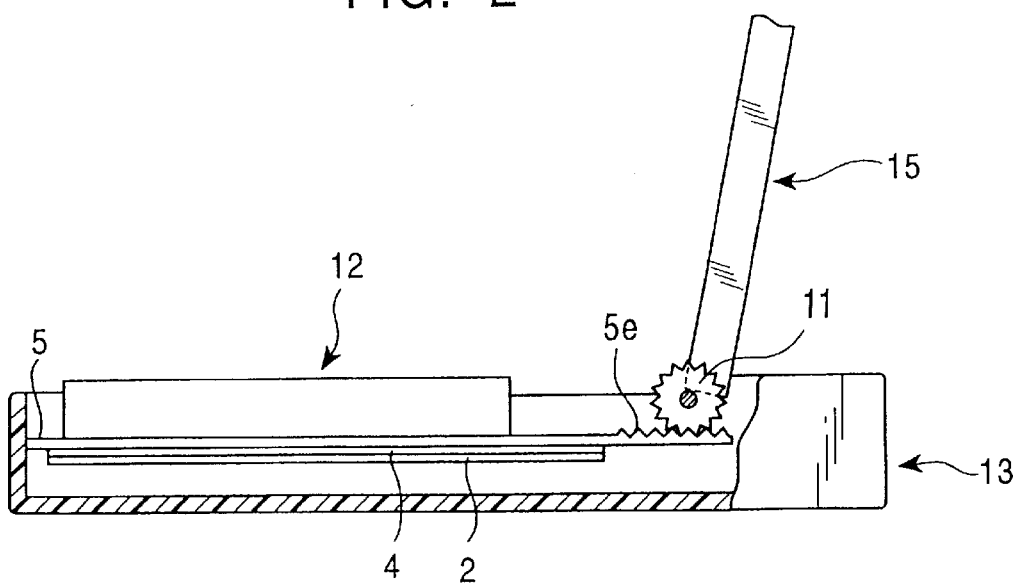
FIG. 2 is a sectional side view of the main portion of the personal computer with the keyboard device incorporated therein in accordance with the present invention.
Figure 9:
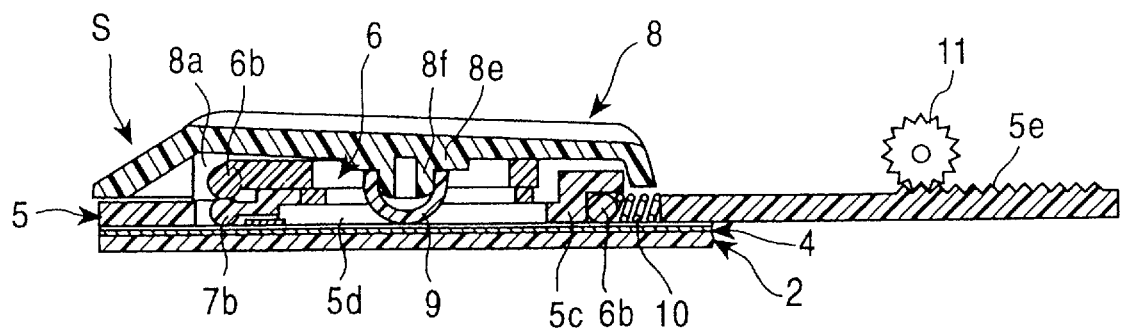
FIG. 9 is a view illustrating the operation of the keyboard device in accordance with the present invention.
Figure 10:
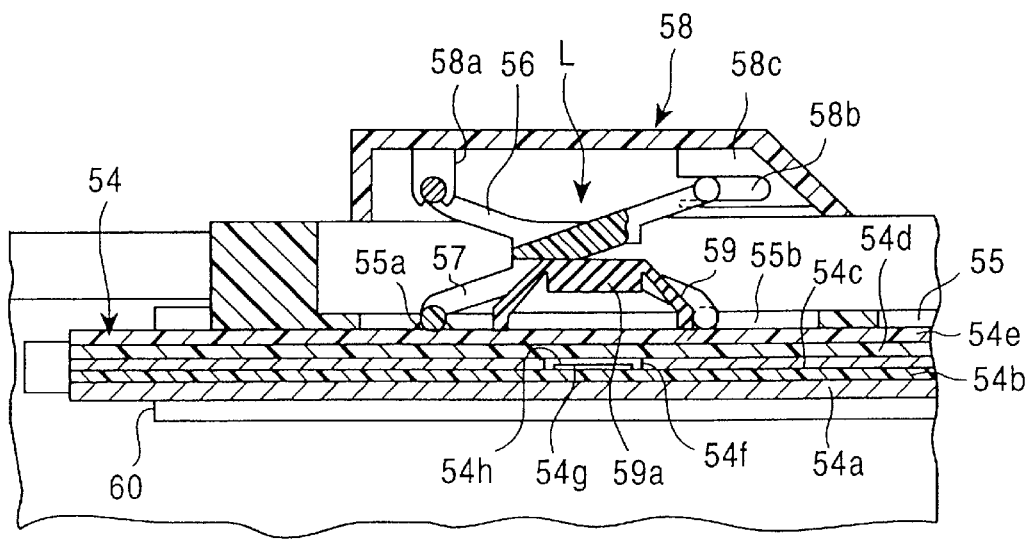
FIG. 10 is a sectional view showing a portion of a conventional keyboard device.
Figure 11:
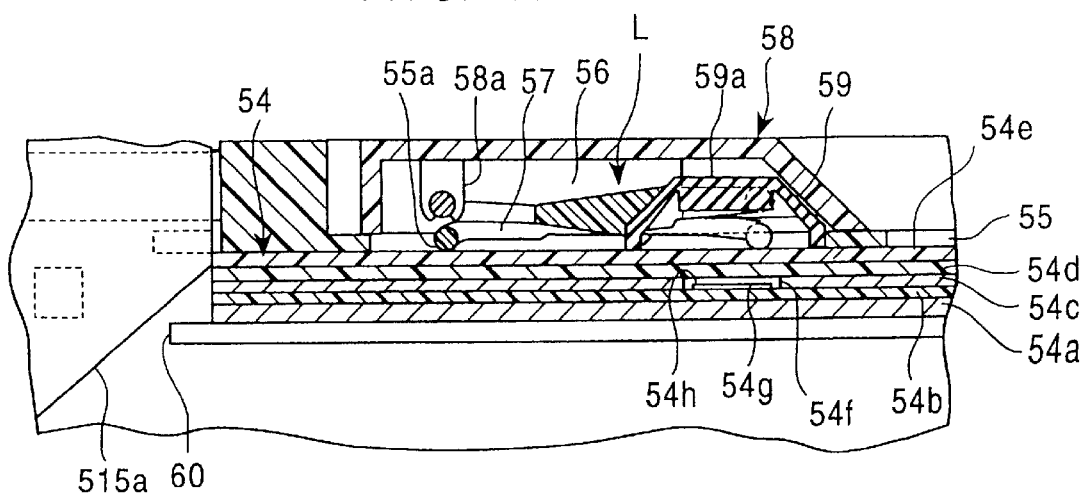
FIG. 11 is a view illustrating the operation of the conventional keyboard device.
Figure 12:
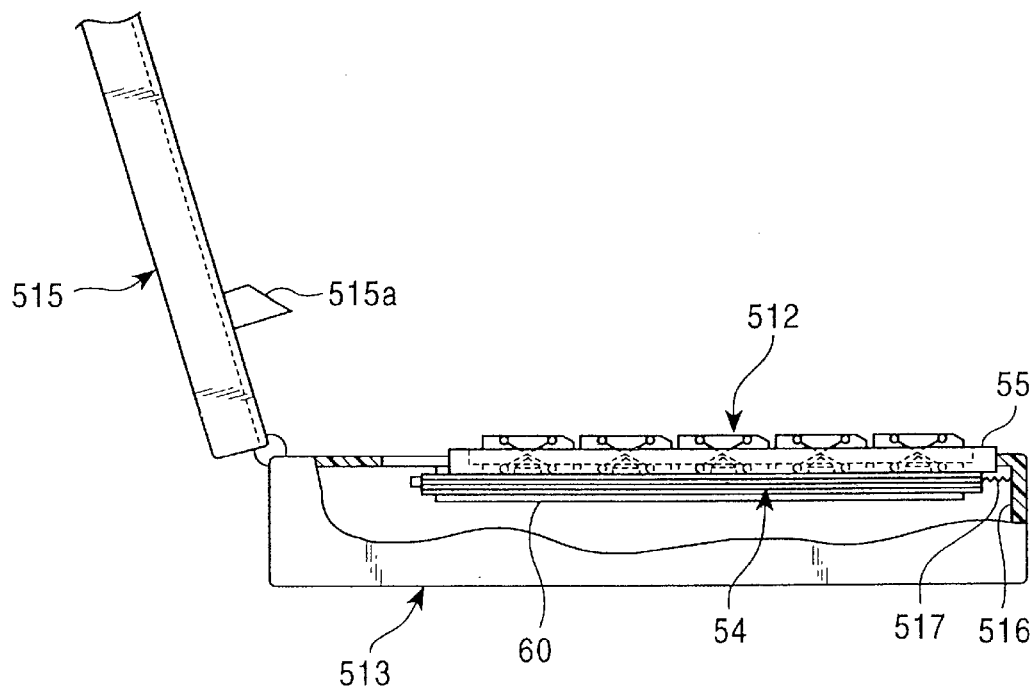
FIG. 12 is a sectional side view of the main portion of a conventional personal computer.
Figure 13:
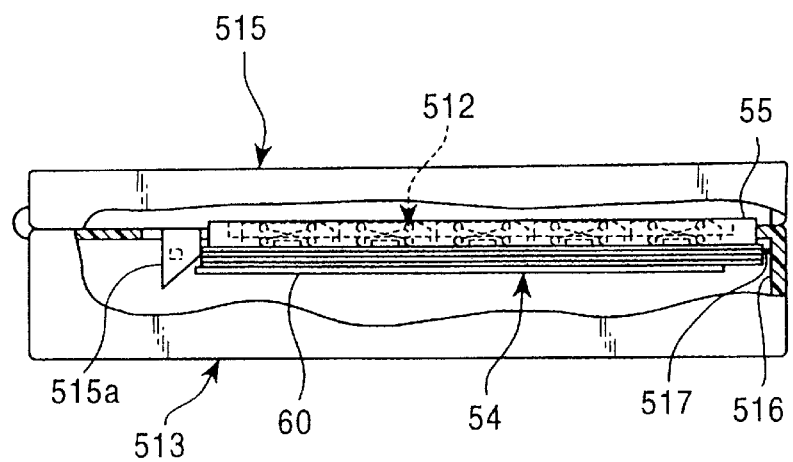
FIG. 13 is a view illustrating the operation of the conventional personal computer.

As shown in FIGS. 2 and 9, a rack 5e is provided at the right end portion of the housing members 5. The rack 5e engages a gear 11 provided at the cover 15. The rotation of the cover 15 causes the housing members 5 to be slidably retained.

A description will now be given of the rising and lowering of the key tops 8 caused by rotation of the cover 15, with reference to FIGS. 2, 4, 8, and 9.

Figure 8:
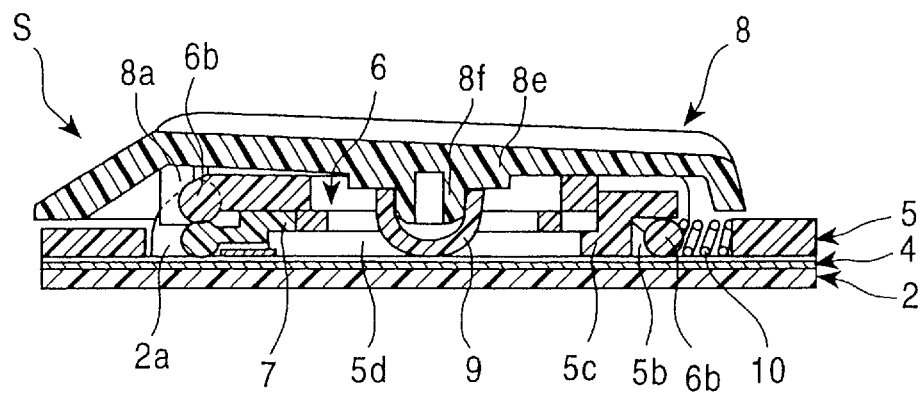
FIG. 8 is a view illustrating the operation of the keyboard device in accordance with the present invention.

When a personal computer is ordinarily operated using the keyboard device 12 after the cover 15 is opened, the biasing force of each spring member 10 keeps each key top supporting structure K in an X shape, and causes each key top 8 to be supported at its highest position, as shown in FIG. 4. When the operator pushes any key top 8 against the biasing force of the associated spring member 10, with the shaft members 6d (refer to FIGS. 3 and 5) associated thereto as center, the ends 6a and 7b of the first and second lever portions 6 and 7 of the associated key top supporting structure K rotates at the retainer portions 8a and 2a, respectively, causing the end 6b of the associated first lever portion 6 to push against the spring member 10 while sliding into the associated slide groove 5b, and the end 7a of the associated second lever portion 7 to slide into the slide grooves 8b. When this occurs, the lowering of the associated key top supporting structure starts, as a result of which the key top 8 is also lowered. FIG. 8 shows a key top 8 which has been lowered.

When the key top 8 is at the lowest position, the associated first lever portion 6 moves into the substantially C-shaped space in the associated second lever portion 7, whereby the associated key top supporting structure K is completely lowered. When any of the key tops 8 is lowered downward, the pusher member 9 associated thereto moves straight down and pushes the membrane switch 4, causing the circuit contacts to contact each other, thereby turning on the switch. Thereafter, releasing the pressed key top 8 causes the biasing force of the associated spring member 10 to push back the key top 8, the key top supporting structure K and the resilient member 9 to their initial positions or positions prior to pressing of the key top 8. The membrane switch 4 pushed by the associated resilient member 9 is restored back to its original condition due to its own restoring force, causing the contacts to separate from each other, thereby turning off the switch.

Accordingly, contact switching is performed.

Thereafter, bringing the cover 15 down onto the keyboard 12 from the open state shown in FIG. 2 causes the housing members 5 to slide towards the right side as a result of rotation of the gear 11 caused by rotation of the cover 15, whereby the end 6b of each first lever portion 6 is pulled towards the right. Therefore, with the associated shaft members 6d (refer to FIGS. 3 and 5) as center, the ends 6a and 7b of each of the first and second lever portions 6 and 7, respectively, remain retained at the retainer portions 8a and 2a, respectively, whereas the end 7a of each second lever portion 7 slides into the slide groove 8b corresponding thereto. Since the retainer portions 2a are integrally formed with the corresponding support plates 2, even if the housings 5 slide, the retainer portions 2a do not move, so that the positions of the protrusions 7b of the corresponding lever portions 7 do not change. On the other hand, since the retainer portions 5c are integrally formed with the corresponding housings 5, if the housings 5 slide, the retainer portions 5c slide with the corresponding housings 5. This causes the protrusions 6b of the corresponding lever portions 6 to slide. Since the protrusions 6b slide while the protrusions 7b remain at fixed locations, the lever portions 6 and 7 are lowered to lower the key tops 8. This causes the key top supporting structures K to be lowered downward, causing the key tops 8 to be lowered downward, so that the entire keyboard device can be made thinner by decreasing the key stroke distance D (refer to FIG. 4). FIG. 9 is a view showing a key top 8 which has been lowered downward as a result of rotation of the cover 15. When the cover 15 is thereafter opened, the housing members 5 slide back to their original positions as a result of the rotation of the cover 15, causing sliding movement of the end 6b of each first lever portion pushed by the spring member 10 corresponding thereto. Therefore, with the shaft members 6d as center, the ends 6a and 7b of the first and second lever portions 6 and 7, respectively, rotate at the retainer portions 8a and 2a, respectively, whereas the end 6b of each first lever portion 6 due to the biasing force of the spring member 10 corresponding thereto slides while it is at their initial positions in the associated slide groove 5b, and the end 7a of each second lever portion 7 slides in the slide grooves 8b corresponding thereto. This causes each key top supporting structure K to be rise upward, and become an X-shaped structure as it had been initially, causing each key top 8 to rise upward and horizontally.

Each key top 8 is supported at its highest position by keeping each key top supporting structure K in an X-shaped structure by the biasing force of each spring member 10.

Although in the above-described embodiment, the housing members 5 were slid to raise and lower the key top structures upward and downward, it is obvious that the supporting member 2 may be slid for the same purpose.

According to the present invention, a first lever portion 1 is retained by a slidable housing member, and a second lever portion is retained by a supporting member. Therefore, since the membrane switch is not slid, it is possible to provide a highly reliable, cheap, and thin keyboard device which allows connection with an electrical circuit in a personal computer with ease.

In addition, according to the present invention, a resilient member, which is provided at a back surface of each key top for operating each switch, is not slid. Therefore, since the conventional problem of wearing caused by sliding in sliding contact between the key top supporting structures and resilient members does not occur, it is possible to provide a long-life, easily operable keyboard device.

Further, according to the present invention, spring members are disposed in the keyboard device, so that tactile feedback and an operational force are provided by the spring members, unlike the conventional case where they are provided by the resilient members themselves. Therefore, it is possible to provide a keyboard device providing a suitable operational force and good tactile feedback.

Still further, according to the present invention, since a first lever portion is retained by a housing member, and a second lever portion is retained by a slidable supporting member, and the membrane switch is not slid, it is possible to provide a highly reliable, cheap, and thin keyboard device, which allows connection with an electrical circuit in the personal computer with ease.

Still further, according to the present invention, a personal computer is constructed so that a housing member is slid, instead of the membrane switch. Therefore, it is possible to provide a highly reliable, cheap, and thin personal computer which allows connection with an electrical circuit in the personal computer with ease.

Still further, according to the present invention, a housing member is slid by opening and closing a cover. Therefore, it is possible to provide cheap personal computers with a simple structure, which are capable of being produced in large quantities.

Still further, according to the present invention, a supporting member is slid by opening and closing a cover. Therefore, it is possible to provide cheap personal computers with a simple structure, which are capable of being produced in large quantities.

What is claimed is:

1. A keyboard device, comprising:
   a supporting plate;
   a key top raisable and lowerable above the supporting plate;
   a first lever portion having one end slidably retained by a housing member in accordance with displacement of the housing member and having the other end rotatably retained by the key top at a back side of said key top;
   a supporting member affixed to and disposed at the supporting plate, the supporting member separated from the housing member;
   a second lever portion having one end rotatably retained by the supporting member and the other end slidably retained by the key top at the back side of said key top, the other end of the second lever portion being separated from the other end of the first lever portion; and
   a membrane switch disposed between the housing member and the supporting member, the membrane switch being affixed to the supporting plate;
   wherein said first lever portion and said second lever portion are combined through a shaft member into the shape of a cross; and
   wherein the housing member is slidably retained, with the sliding movement of the housing member causing said first lever portion and said second lever portion combined into the shape of a cross to be one of raised and lowered in accordance with a sliding direction of the housing member.

2. A keyboard device according to claim 1, further comprising a membrane switch operating resilient member provided at a back surface of said key top.

3. A keyboard device according to claim 1, further comprising a spring member, disposed at the housing member to face the supporting member, to push said one end of said first lever portion.

4. A keyboard device according to claim 2, further comprising a spring member, disposed at the housing member to face the supporting member, to push said one end of said first lever portion.

5. A keyboard device, comprising:
   a supporting plate;
   a key top raisable and lowerable above the supporting plate;
   a housing member affixed to and disposed at the supporting plate;
   a first lever portion having one end slidably retained by the housing member and the other end rotatably retained by the key top at a back side of said key top;
   a supporting member slidably disposed at the supporting plate, the supporting member separated from the housing member;
   a second lever portion having one end rotatably retained by the supporting member and the other end slidably retained by the key top at the back side of said key top, the other end of the second lever portion being separated from the other end of the first lever portion, the second lever portion slidable in accordance with a displacement of the supporting member; and a membrane switch disposed between the housing member and the supporting member, the membrane switch being affixed to the supporting plate;

wherein said first lever portion and said second lever portion are combined through a shaft member into the shape of a cross; and wherein the supporting member is slidably retained, with the sliding movement of the supporting member causing said first lever portion and said second lever portion combined into the shape of a cross to be one of raised and lowered in accordance with a sliding direction of the supporting member.

6. A keyboard device comprising:

a keyswitch member including a plurality of key switches, each key switch including:
  a supporting plate;
  a key top raisable and lowerable above the supporting plate;
  a first lever portion having one end slidably retained by a housing member in accordance with displacement of the housing member and having the other end rotatably retained by the key top at a back side of said key top;
  a supporting member affixed to and disposed at the supporting plate, the supporting member separated from the housing member;
  a second lever portion having one end rotatably retained by the supporting member and the other end slidably retained by the key top at the back side of said key top, the other end of the second lever portion being separated from the other end of the first lever portion; and
  a membrane switch disposed between the housing member and the supporting member, the membrane switch being affixed to the supporting plate;
  wherein said first lever portion and said second lever portion are combined through a shaft member into the shape of a cross; and
  wherein the housing member is slidably retained, with the sliding movement of the housing member causing said first lever portion and said second lever portion combined into the shape of a cross to be one of raised and lowered in accordance with a sliding direction of the housing member; and
  wherein the keyboard device further comprises:
    a rotatable cover with a display device incorporated therein;
    wherein the housing member slides in response to an opening or closing operation of the cover.

7. A keyboard device comprising:

a keyswitch member including a plurality of key switches, each key switch including:
  a supporting plate;
  a key top raisable and lowerable above the supporting plate;
  a housing member affixed to and disposed at the supporting plate;
  a first lever portion having one end slidably retained by the housing member and the other end rotatably retained by the key top at a back side of said key top;
  a supporting member slidably disposed at the supporting plate, the supporting member separated from the housing member;
  a second lever portion having one end rotatably retained by the supporting member and the other end slidably retained by the key top at the back side of said key top, the other end of the second lever portion being separated from the other end of the first lever portion, the second lever portion slidable in accordance with a displacement of the supporting member; and
  a membrane switch disposed between the housing member and the supporting member, the membrane switch being affixed to the supporting plate;
  wherein said first lever portion and said second lever portion are combined through a shaft member into the shape of a cross; and
  wherein the supporting member is slidably retained, with the sliding movement of the supporting member causing said first lever portion and said second lever portion combined into the shape of a cross to be one of raised and lowered in accordance with a sliding direction of the supporting member; and
  wherein the keyboard device further comprises:
    a rotatable cover with a display device incorporated therein;
    wherein the supporting member slides in response to an opening or a closing operation of the cover.

8. A computer comprising:

a personal computer; and
a keyboard device, comprising:
  a supporting plate;
  a key top raisable and lowerable above the supporting plate;
  a first lever portion having one end slidably retained by a housing member in accordance with displacement of the housing member and having the other end rotatably retained by the key top at a back side of said key top;
  a supporting member affixed to and disposed at the supporting plate, the supporting member separated from the housing member;
  a second lever portion having one end rotatably retained by the supporting member and the other end slidably retained by the key top at the back side of said key top, the other end of the second lever portion being separated from the other end of the first lever portion; and
  a membrane switch disposed between the housing member and the supporting member, the membrane switch being affixed to the supporting plate;
  wherein said first lever portion and said second lever portion are combined through a shaft member into the shape of a cross; and
  wherein the housing member is slidably retained, with the sliding movement of the housing member causing said first lever portion and said second lever portion combined into the shape of a cross to be one of raised and lowered in accordance with a sliding direction of the housing member.

9. A personal computer according to claim 8, further comprising a membrane switch operating resilient member provided at a back surface of said key top.

10. A computer according to claim 8, further comprising a spring member, disposed at the housing member to face the supporting member, to push said one end of said first lever portion.

11. A computer according to claim 9, further comprising a spring member, disposed at the housing member to face the supporting member, to push said one end of said first lever portion.

* * * * *

UNITED STATES PATENT AND TRADEMARK OFFICE
CERTIFICATE OF CORRECTION

PATENT NO. : 6,172,868 B1
DATED : January 9, 2001
INVENTOR(S) : Nobuhiro Oura

It is certified that error appears in the above-identified patent and that said Letters Patent is hereby corrected as shown below:

<u>Title page,</u>
Item [30], under "Foreign Application Priority Data", delete "Jul. 30, 1997" and substitute -- Jun. 30, 1997 -- in its place.

Signed and Sealed this

Sixteenth Day of July, 2002

Attest:

Attesting Officer

JAMES E. ROGAN
*Director of the United States Patent and Trademark Office*